United States Patent
Kemmler et al.

(10) Patent No.: US 9,305,034 B2
(45) Date of Patent: Apr. 5, 2016

(54) ENHANCED REPORTING SYSTEM

(71) Applicants: Andreas Kemmler, Boennigheim (DE); Torsten Kamenz, Wiesloch (DE)

(72) Inventors: Andreas Kemmler, Boennigheim (DE); Torsten Kamenz, Wiesloch (DE)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 14/067,187

(22) Filed: Oct. 30, 2013

(65) Prior Publication Data

US 2015/0120785 A1 Apr. 30, 2015

(51) Int. Cl.
*G06F 17/30* (2006.01)
(52) U.S. Cl.
CPC .... *G06F 17/30292* (2013.01); *G06F 17/30575* (2013.01); *G06F 17/30592* (2013.01)
(58) Field of Classification Search
CPC .......... G06F 17/30292; G06F 17/30575; G06F 17/30592; G06F 17/30; G06Q 30/0202; H04L 67/10
USPC ................... 707/803, 736, E17.045
See application file for complete search history.

(56) References Cited

U.S. PATENT DOCUMENTS

| | | | | |
|---|---|---|---|---|
| 7,007,033 | B1 * | 2/2006 | Rothschiller | G06F 17/2247 715/705 |
| 7,676,786 | B2 * | 3/2010 | Shenfield | G06F 8/10 717/104 |
| 8,285,688 | B2 * | 10/2012 | Krishnaswamy | G06F 8/71 707/687 |
| 8,392,439 | B2 * | 3/2013 | Bodamer | G06F 17/30306 707/695 |
| 2004/0181543 | A1 * | 9/2004 | Wu | G06F 17/30572 |
| 2005/0131870 | A1 * | 6/2005 | Krishnaswamy | G06F 17/30551 707/E17.014 |
| 2006/0085489 | A1 * | 4/2006 | Tomic | G06F 12/123 711/E12.076 |
| 2006/0173873 | A1 * | 8/2006 | Prompt | G06F 17/30569 707/E17.006 |
| 2008/0288498 | A1 * | 11/2008 | Hinshaw | G06F 17/30575 |
| 2009/0070121 | A1 * | 3/2009 | Leonelli | G06Q 10/103 705/301 |

(Continued)

FOREIGN PATENT DOCUMENTS

| | | |
|---|---|---|
| EP | 1241593 A2 | 9/2002 |
| EP | 1376989 A2 | 1/2004 |
| EP | 2040180 A1 | 3/2009 |

OTHER PUBLICATIONS

"European Application Serial No. 14190178.5, Search Report mailed Feb. 26, 2015", 10 pgs.

(Continued)

*Primary Examiner* — Anh Ly
(74) *Attorney, Agent, or Firm* — Schwegman Lundberg & Woessner, P.A.

(57) ABSTRACT

A system receives database tables from a plurality of computer systems. Each of the database tables is associated with a particular computer system. Each particular computer system is associated with a particular schema. The database tables are stored in a computer storage device according to the particular schema of the computer system with which each database table is associated. Database views are created and stored. Each of the views is associated with a particular schema. A configuration table according to the particular schemas of each of the computer systems is generated. The configuration table is displayed on a display device. A selection of one or more schemas is received from the display on the computer display device. The database view from one of the selected database schemas is used as a template to generate a view for all of the selected schemas.

18 Claims, 7 Drawing Sheets

(56) References Cited

U.S. PATENT DOCUMENTS

| | | | |
|---|---|---|---|
| 2009/0070162 A1* | 3/2009 | Leonelli | G06Q 10/0633 705/7.27 |
| 2009/0077044 A1* | 3/2009 | Krishnaswamy | G06F 17/30551 707/E17.014 |
| 2010/0094716 A1* | 4/2010 | Ganesan | G06Q 10/06 705/26.1 |
| 2010/0235725 A1* | 9/2010 | Drayton | G06F 17/2247 715/234 |
| 2011/0231398 A1* | 9/2011 | Bodamer | G06F 17/30306 707/736 |
| 2012/0239609 A1* | 9/2012 | Zhao | G06F 17/30292 707/600 |
| 2013/0173539 A1 | 7/2013 | Gilder et al. | |

OTHER PUBLICATIONS

"How to . . . Realize Cross System Reporting Using SAP HANA Live content", SAP HANA 1.0 SPS 05. Version 1.1, (2013), 50 pgs.

* cited by examiner

ENHANCED REPORTING SYSTEM

TECHNICAL FIELD

The present disclosure relates to a computer-based reporting system.

BACKGROUND

A business organization more than likely has a need to, and indeed does, generate a multitude of reports about its business operations relating to several topics such as human resources, finance, marketing, etc. The business organization may use different systems and/or sub-systems in generating these reports, including different processors, databases, and other computer system components. The totality of the reports generated by a business organization can be referred to as the organization's business suite applications. These business suite applications can define a specific set of analytical scenarios that are executed.

DETAILED DESCRIPTION

Figure 1:
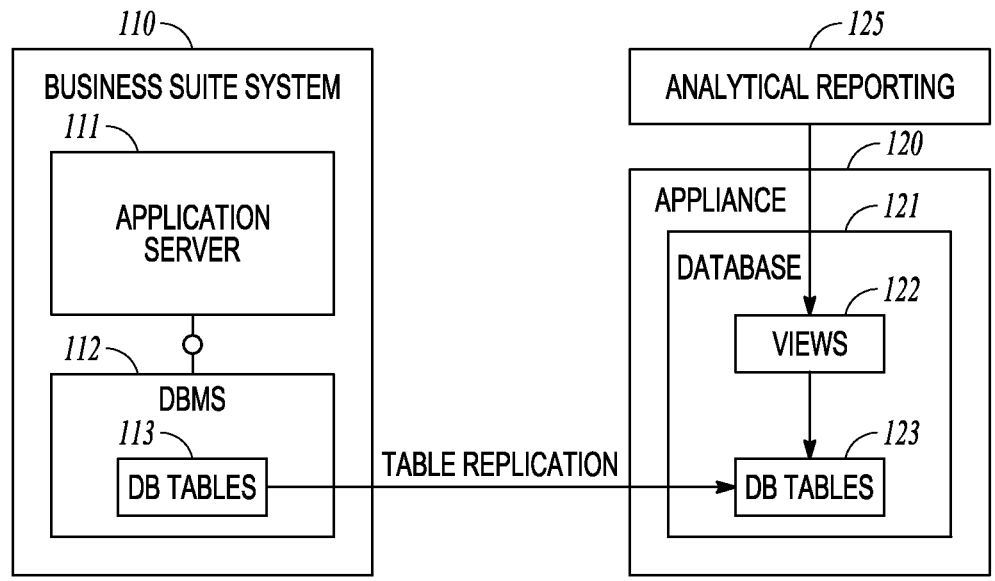
FIG. 1 is a block diagram illustrating a business suite system coupled to an in-memory system.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

In a computer system that uses an in-memory database, such as the SAP HANA® database, the in-memory database allows the integration of online transaction-based (OLTP) processes and online analytics-based (OLAP) processes on one database platform. The online/in-memory database makes it possible to run applications, especially analytical applications, directly on the database without the necessity of an application server.

Such in-memory database systems can include several parts. There is first the in-memory database that has column and row store capabilities. An in-memory database allows high-performance processing and analysis of data that is already on the database, and it therefore does not require the transfer of data from the database to an application server. With an in-memory database, it is possible to push performance-critical parts of the business logic down to the database.

An in-memory database can also include administration and development tools. The in-memory database can also include tools for the integration of data from other databases, especially from databases running a business suite system. An in-memory database can be delivered as an appliance, that is, a combination of specific hardware and software.

An in-memory database can further allow the implementation of analytical scenarios on top of the database schema of the business suite that originated from a transactional scope. With this approach, it is possible to add additional functionality to the system without changing the existing data structure and processes.

In a business suite system landscape, an in-memory database can be deployed in at least two different manners. First, the in-memory database can be used as the primary database of the business suite system, thereby replacing any other standard database product. This first deployment scenario enables direct analytical access to the data stored in the business suite system via analytical tools. In the second deployment manner, the in-memory database is installed as a secondary database side-by-side with the existing business suite system and the database of the existing business suite system. The data of the business suite system that are needed for the analytical applications can be replicated in 'real-time' to the in-memory database. Consequently, the data are in sync between the in-memory system and the business suite system. The analytical applications are then executed on the in-memory database, and the existing business suite system is not influenced or changed.

In current systems, there is no way for customers to reuse database views delivered by a software vendor for cross schema analytics. A Virtual Data Model (VDM) delivered by the software vendor offers analytic insight into one system/database schema, but not on several other system/database schemas. However, often customers have more than one enterprise resource planning (ERP) or business suite system, and it would be beneficial if the customers could get a consolidated analytic view on these multiple systems. Consequently, an embodiment addresses this issue by offering a software tool that can be used to generate a cross schema variant of a complex data model that is originally designed for only a single database schema. The generation is executed by replacing the database table access of the VDM views with a corresponding access to the tables in the relevant database schemas. The data from the different tables are combined, for example, via a UNION ALL SQL statement. The generation considers the concrete customer situation and includes all the database schemas specified by a customer in the corresponding configuration table. The resulting customer specific variant of the Virtual Data Model (VDM) can then be used for schema specific and for cross schema analytic scenarios, considering the data from different schemas as if they would belong to the same database schema.

With the foregoing in mind, an embodiment provides an analytics foundation that provides new and easily generated analytical reports and applications for business suite data. The new analytical data model supporting these scenarios is implemented in an in-memory database as database views, and can be referred to as a virtual data model (VDM). The VDM does not change the existing business suite data model, and it doesn't change any suite data. To benefit from the new data model, data do not need to be extracted and there is no additional persistence needed. The data model is based on the original (or existing) data.

The VDM can be accessed via standard access protocols like multidimensional expressions (MDX) and structured query language (SQL). System users are able to easily extend the VDM for their own specific purposes. The VDM is an enabler for a new openness and flexibility in the analytic world. Every analytic tool that is able to connect via SQL or MDX (like MS Excel, Crystal Reports, or Business Object Explorer) can be used to directly access the VDM for analytics and reporting on operational data. FIG. 1 illustrates a side-by-side approach that was disclosed above. Specifically, FIG. 1 illustrates a business suite system 110 that includes an application server 111 and a database management system 112 that includes database tables 113. As noted above, the database tables 113 can be replicated in real time to the in-memory appliance 120, and stored as database tables 123 in the in-memory database 121. Views 122 provide analytical access into the in-memory database tables 123. Analytical reporting tools 125 use the views 122 to access the in-memory database tables 123.

In many situations, users would like to replicate data from more than one of their enterprise resource planning (ERP) systems (or schemas) to the same in-memory database. For example, a user may have a schema that relates to human resource information on its European employees, and may have another schema that relates to human resource information for its Australian employees. The two schemas may have some similarities and some differences. The users usually replicate this data from more than one ERP system into different database schemas. Doing this offers the users analytic possibilities that are so far only possible with a business information (BI) system into which data from several connected ERP systems are extracted.

It would be beneficial for a user to be able to use the in-memory content delivered from the software vendor as the data model for all connected ERP systems. It would also be beneficial for a user to be able to get a 'cross schema view' on the user's replicated data, wherein the cross schema view covers not only the data of one replicated system but of several replicated systems. It would further be beneficial for users to have this cross schema view based on a new data model (that is, a Virtual Data Model or VDM), which the user may already use for analytics of a single database schema.

Figure 2:
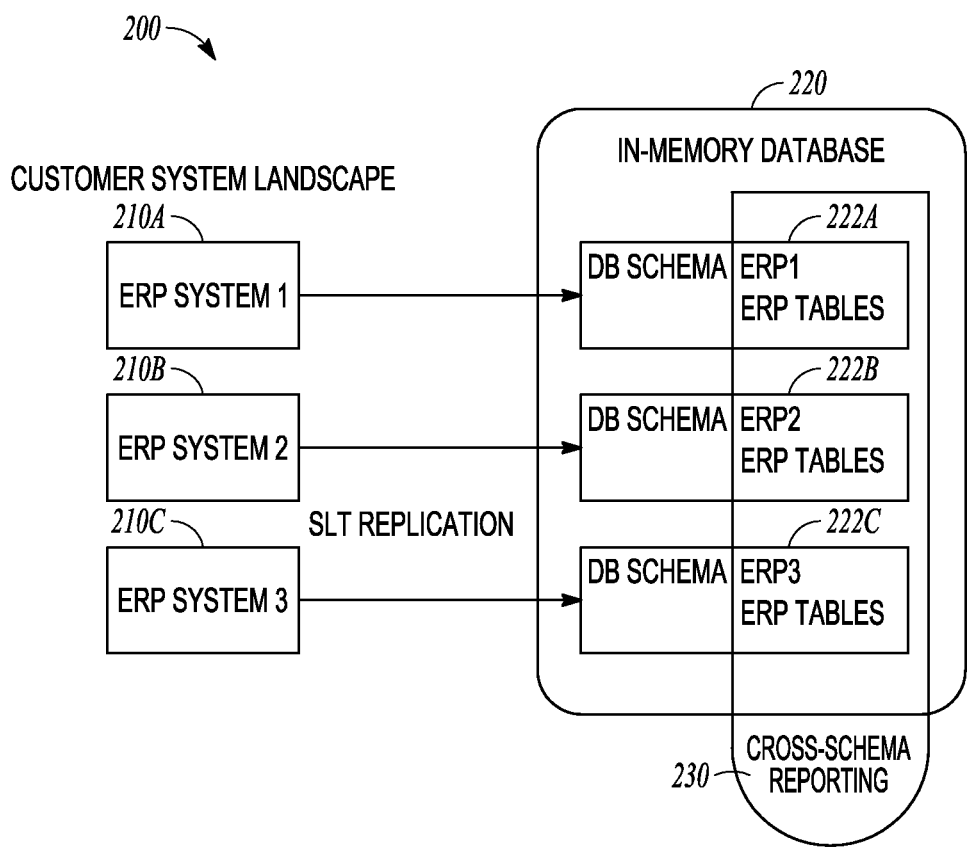
FIG. 2 is a block diagram illustrating the relationships and connectivity of multiple user/customer enterprise resource planning (ERP) systems and an in-memory system.

FIG. 2 is a block diagram 200 illustrating the relationships and connectivity of multiple user/customer ERP systems and an in-memory system. The system 200 includes several ERP systems 210A, 210B, and 210C. These multiple ERP systems can be associated with a single user or customer, or more than one user or customer. The database schemas for each of these ERP systems are replicated into the in-memory database. Specifically, the replication results in a database schema 222A for ERP system 210A, a database schema 222B for ERP system 210B, and a database schema 222C for database schema 210C. As will be explained in detail herein, the system 200 uses the VDM or views to generate cross schema reporting 230 capabilities for the database schemas 220A, 220B, and 220C.

A problem could be that the Virtual Data Model (VDM) is designed for usage of exactly one database schema. It is therefore not technically possible to model views that dynamically access a flexible number of database schemas. However, this 'flexibility' could be beneficial since in many circumstances the number of relevant ERP systems for a specific customer or user is not fixed. To address this issue, an embodiment leverages the huge semantic investment in a Virtual Data Model (VDM) and offers the possibility of using the VDM not only for the data of one backend system, but for a combined view on several backend systems.

An embodiment includes a software tool that creates, based on the Virtual Data Model (VDM) fitting to a single schema, a variant of this Virtual Data Model that automatically considers the data of more than one database schema. Additionally, a corresponding configuration table is provided so that users/customers can specify which of their database schemas are to be considered. The software tool considers the customer configurations of this configuration table. The software tool then uses the database views of the Virtual Data Model as a template, replaces the part of the VDM views (that is, the database query language) that accesses a database table with a corresponding access to multiple database tables from different schemas corresponding to the configuration in the configuration table. This functionality is illustrated in FIG. 3.

Figure 3:
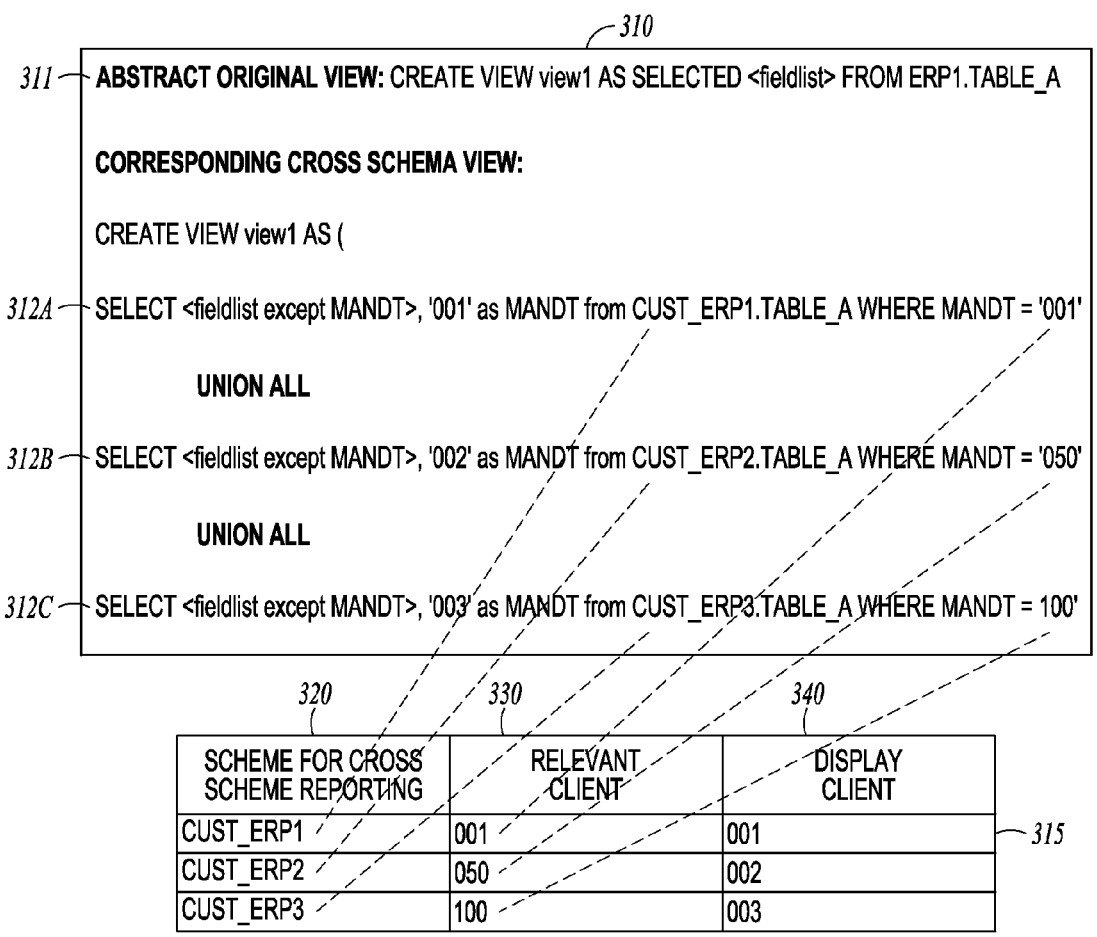
FIG. 3 is a block diagram illustrating the modification of a database view of a virtual data model to access multiple database tables from different schemas.

Specifically, FIG. 3 illustrates at 310 that an original view is created by selecting <fieldlist> from ERP1.TABLE_A at 311. A corresponding cross-schema view 320 is created using configuration table 315, which allows a user to select the schemas that the user would like to view. Based on the user's selection, the system generates the database query statements such as SELECT <fieldlist except MANDT> from CUST_ERP1.TABLE_A, CUST_ERP2.TABLE_A, and CUST_ERP3.TABLE_A at 312A, 312B, and 312C. The MANDT identifies the relevant client 330 in the particular ERP database, and the selection from each ERP database is assigned a display client identifier 340, which as explained in detail below, is used in the display concepts of client unification and client separation.

Figure 4:
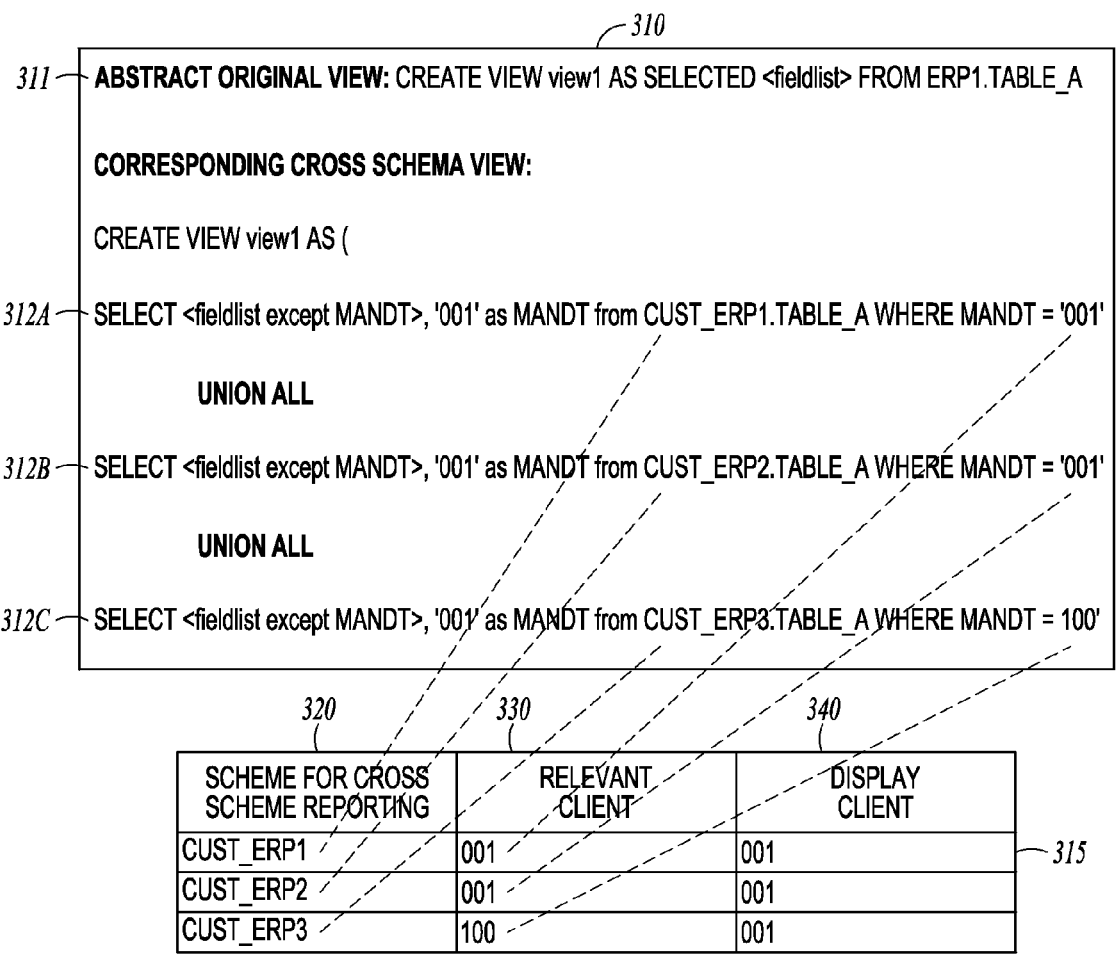
FIG. 4 illustrates a client unification option when creating an expanded database schema.

The part of the view that accesses a database table (e.g., SELECT <fieldlist> FROM ERP1.TABLE_A) is replaced by an access of the same table in multiple database schemas (312A, 312B, 312C). The result is stored as a new view (a multi schema view) in a content package in a customer namespace. Customers/Users can choose which system client that they want to use from each database schema, and they can also specify whether all chosen clients are shown as the same client (Client Unification) or as one or more different clients (Client Separation). In the Client Unification option (See FIG. 4), the data from different database schemas are shown as if they would belong to the same schema and to the same client. This is indicated in FIG. 4 via the value of '001' for all clients in the display client field of the configuration table.

In the client unification scenario, the customizing tables are handled specifically. One schema and client have to be specified from which the customizing data are selected. In order to execute this, an additional configuration table is used (not shown in FIG. 4). This is implemented this way since a UNION ALL database query command (which is done for the other tables) on customizing data could lead to incorrect results when the customizing table gets joined with application data tables. This option then is best used by users when the users have already harmonized customizing data for the database schemas that the customers want to use in the cross schema analytic scenario.

Figure 5:
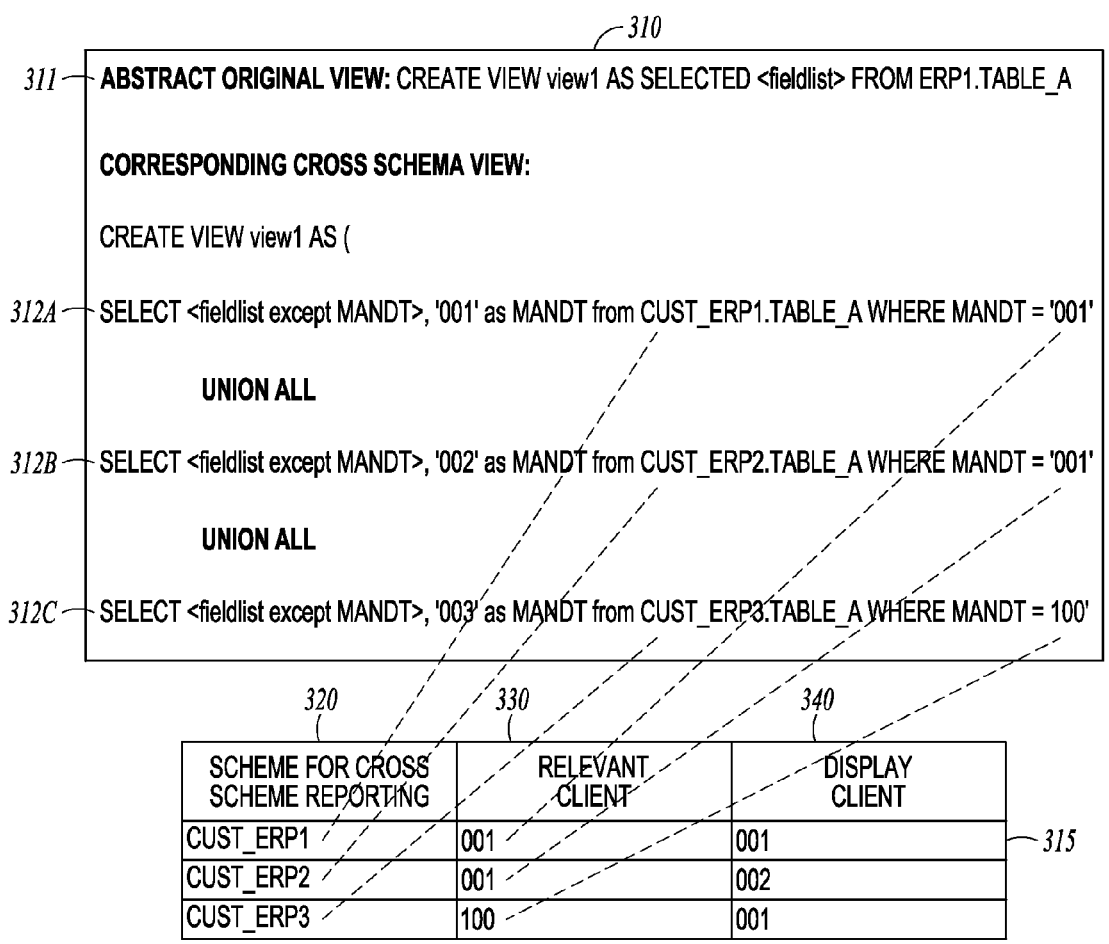
FIG. 5 illustrates a client separation option when creating an expanded database schema.

In the client separation option (FIG. 5), wherein the display client values 340 are different values, the data from different database schemas are shown as if they belonged to the same schema but to different system clients. That is, the data of each database schema get associated and displayed with a different client identifier. With the separation option, it is still possible to get a 'client specific' sight on the data. It is then possible to use the cross schema analytic data model 125 for different database schemas independently. Additionally, it is possible to do aggregations across system clients to get a cross client view on the data.

The cross schema view generation steps can be summarized as follows. A customer/user connects the relevant back-end systems to the software vendor's in-memory database via a corresponding replication scenario. The data of the connected system are replicated into separate database schemas based on the subsystem (e.g., different ERP sub-systems) from which they originate. The customer/user specifies the in-memory schemas that are to be considered for the cross schema analytics in the corresponding configuration table. The customer then specifies the system client that is to be considered in each database schema. This implementation handles the situation wherein the data in the different schemas is not harmonized regarding clients (that is, the same system client is used for productive data in different database schemas). The customer/user specifies whether client unification or client separation is desired and configures the displayed client(s). If client unification is desired, then a schema and client is specified from where the customizing data are taken. The customer/user specifies the in-memory content package in a customer name space that is to be used for the resulting cross schema VDM variant. A customer administrator specifies which part of the VDM is to be considered, in cases wherein only a part of the VDM is relevant for the cross schema analytics. The customer/user then commences the cross schema VDM generation.

Figure 6A:
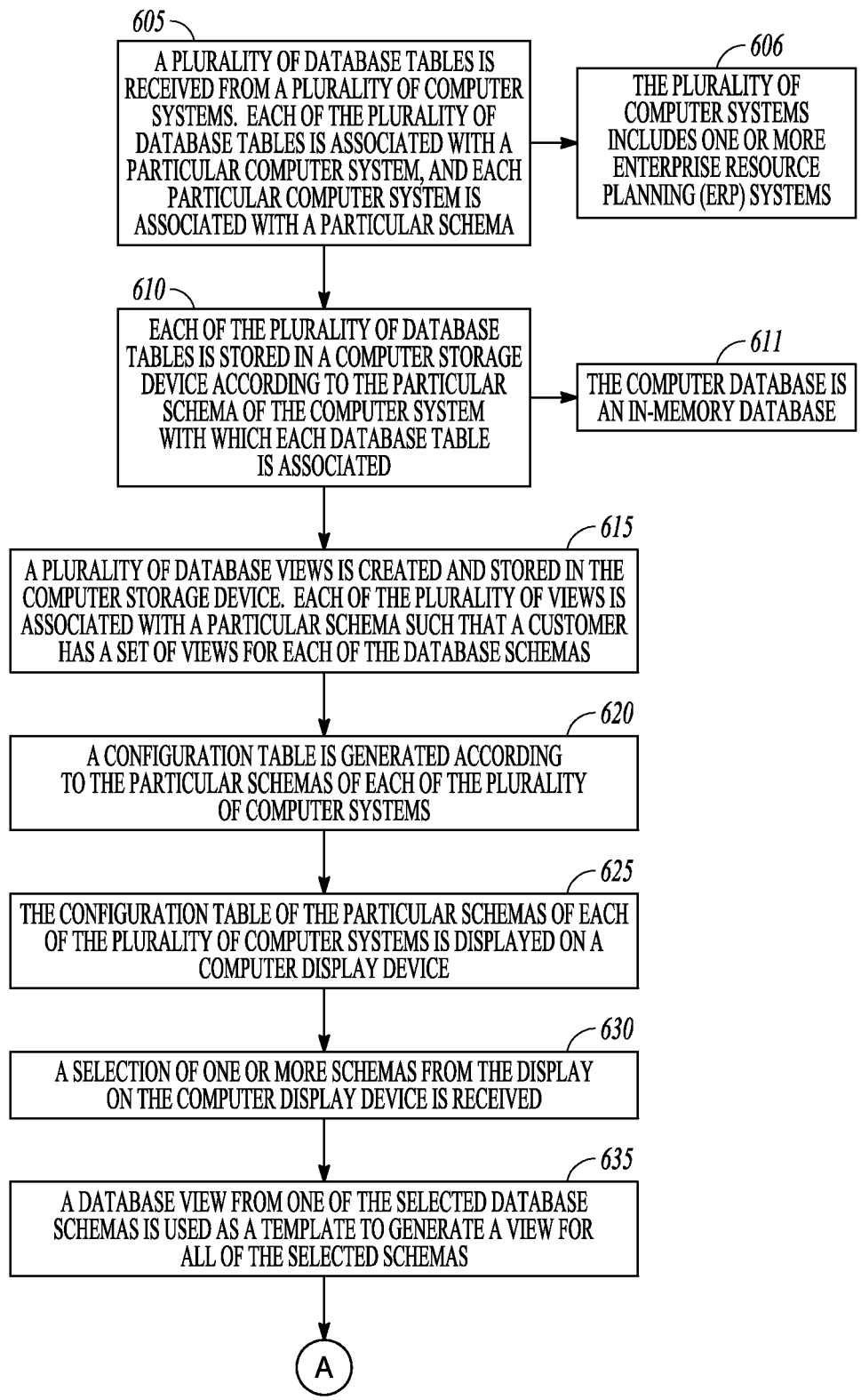
FIGS. 6A and 6B are a block diagram illustrating operations and steps of a system and method to generate cross database schema analytics using virtual data models.
Figure 6B:
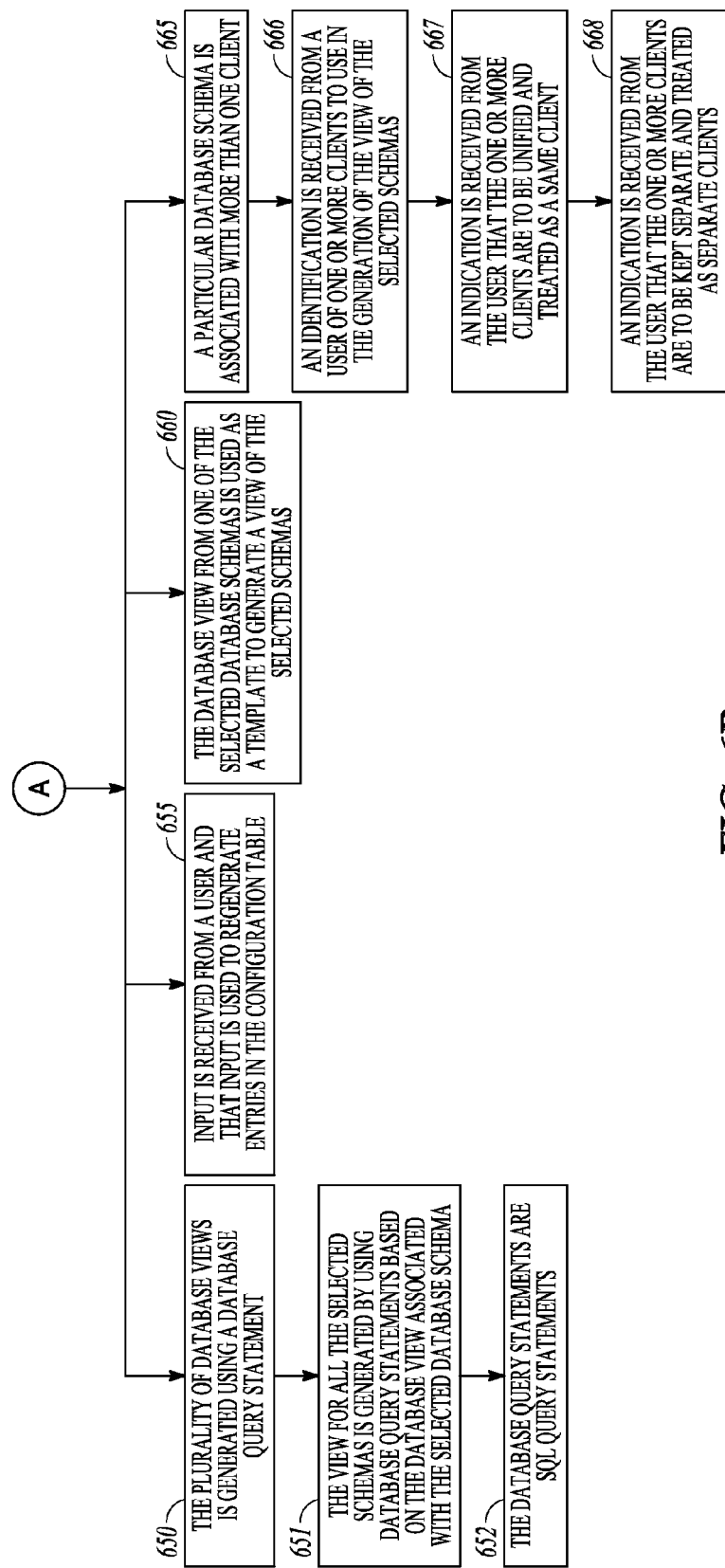

FIGS. 6A and 6B illustrate in a block diagram the above-disclosed processes and mechanisms for generating analytic reports on a computer system, and in particular, a computer system that includes an in-line memory database for the generation of the reports. FIGS. 6A and 6B include a number of process blocks 605-668. Though arranged serially in the example of FIGS. 6A and 6B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 6A and 6B, at 605, a plurality of database tables is received from a plurality of computer systems. Each of the plurality of database tables is associated with a particular computer system, and each particular computer system is associated with a particular schema. As noted at 606, the plurality of computer systems includes one or more enterprise resource planning (ERP) systems. At 610, each of the plurality of database tables is stored in a computer storage device according to the particular schema of the computer system with which each database table is associated. As noted at 611, the computer database can be an in-memory database. Operations 605, 606, 610, and 611 permit a customer who has more than one ERP system, such as different ERP systems for different geographical areas, to replicate the different ERP systems to a software vendor's database, and in an embodiment, a software vendor's in-memory database. Operations 605, 606, 610, and 611 further permit the different ERP systems to be replicated to different schemas in the software vendor's database.

At 615, a plurality of database views is created and stored in the computer storage device. Each of the plurality of views is associated with a particular schema such that a customer has a set of views (virtual data models) for each of the database schemas. At 620, a configuration table is generated according to the particular schemas of each of the plurality of computer systems. Example implementations of the configuration table are illustrated at 315 in FIGS. 3, 4, and 5. In an embodiment, the software vendor delivers the configuration table to its customers and the customers create entries in the configuration table. These customer-created entries specify which of the customer's schemas and clients of these schemas can take part in the multi-schema scenario. At 625, the configuration table of the particular schemas of each of the plurality of computer systems is displayed on a computer display device. As just noted, the entries in the configuration table are created by the customer of the software vendor. At 630, a selection of one or more schemas from the display on the computer display device is received. The entries selected or entered by a user are stored on a database and are therefore available for the generation of views. At 635, a database view from one of the selected database schemas (VDM) is used as a template to generate a view for all of the selected schemas.

At 650, the plurality of database views is generated using a database query statement. At 651, the view for all the selected schemas is generated by using database query statements based on the database view associated with the selected database schema. Specifically, referring to FIG. 3 for example, the view from the selected database schema 311 is used to create the view for all selected schemas 312A, 312B, and 312C. As further illustrated in FIG. 3, the database query statements SELECT and UNION ALL are used to generate this view. At 652, the database query statements are SQL query statements. In summary, the generation of the view is based on replacement of the database table access, which in turn is accomplished by replacing the database query statements (312A, 312B, 312C).

At 655, input is received from a user and that input is used to regenerate entries in the configuration table. At 660, the database view from one of the selected database schemas is used as a template to generate a view of the selected schemas. This is accomplished by modifying the view so that the view is capable of accessing additional database tables in the identified schemas.

At 665, a particular database schema is associated with more than one client. The client in this instance can refer to an actual identifiable unique individual or business organization or it can refer to a particular software module. At 666, an identification is received from a user of one or more clients to use in the generation of the view of the selected schemas (from the configuration table). At 667, an indication is received from the user that the one or more clients are to be unified and treated as a same client. As noted above, this feature is illustrated in FIG. 4. At 668, an indication is received from the user that the one or more clients are to be kept separate and treated as separate clients. As noted above, this feature is illustrated in FIG. 5.

Figure 7:
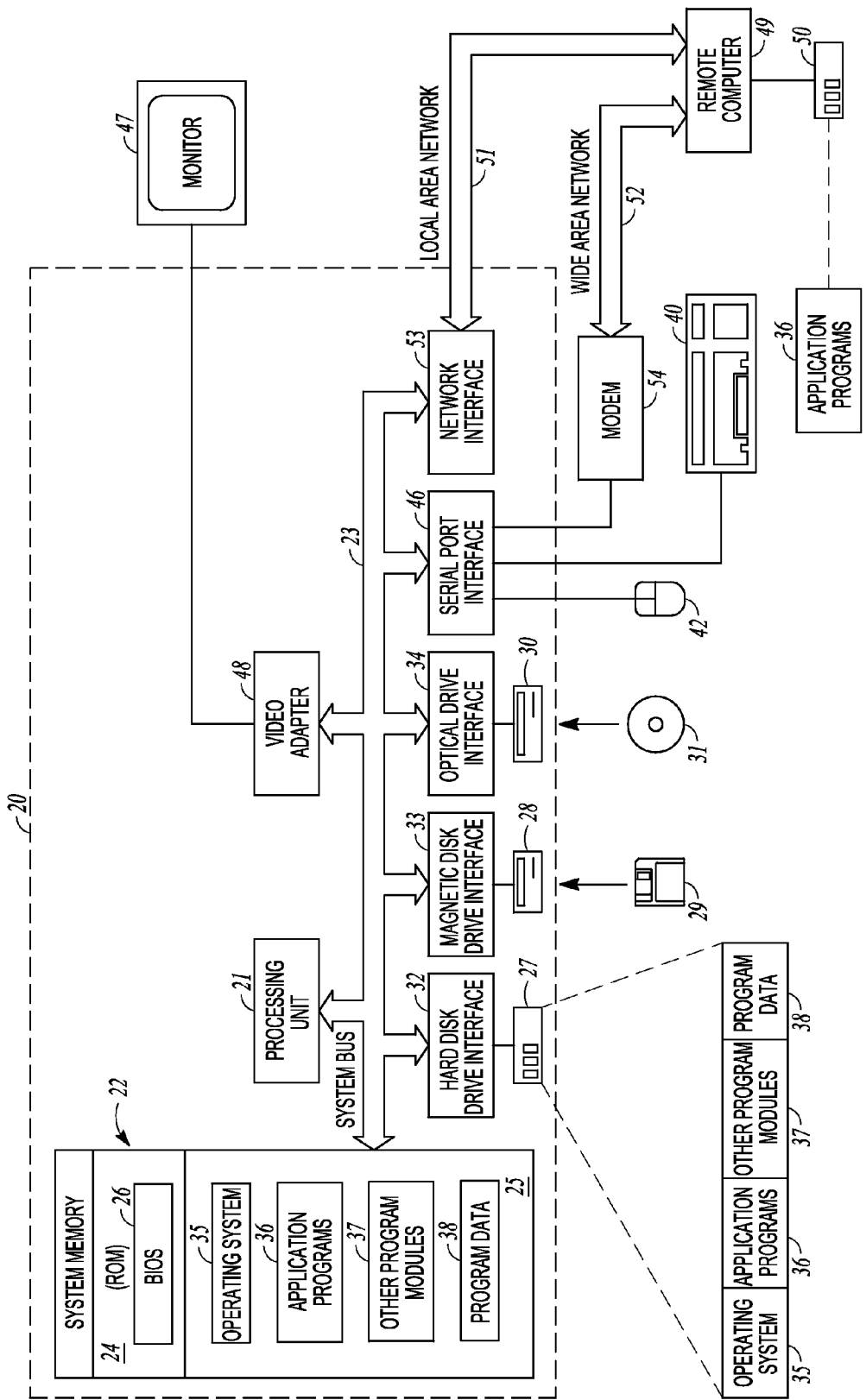
FIG. 7 is a block diagram illustrating a computer system in connection with which one or more embodiments of the present disclosure can execute.

FIG. 7 is an overview diagram of hardware and an operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a computer processor operable to:
receive a plurality of database tables from a plurality of computer systems, wherein each of the plurality of database tables is associated with a particular computer system, wherein each particular computer system is associated with a particular schema, and wherein the plurality of computer systems comprises enterprise resource planning (ERP) systems of a customer of a software vendor;
store each of the plurality of database tables in a computer storage device according to the particular schema of the computer system with which each database table is associated, wherein the computer storage device comprises an in-memory database of the software vendor;
create a plurality of database views and store the plurality of database views in the computer storage device, wherein each of the plurality of views is associated with a particular schema;
generate a configuration table according to the particular schemas of each of the plurality of computer systems;
display the configuration table of the particular schemas of each of the plurality of computer systems on a computer display device;
receive a selection of one or more schemas from the display on the computer display device; and
use a database view from one of the selected database schemas as a template to generate a view for all of the selected schemas; thereby replicating the ERP systems of the customer to different schemas in the in-memory database of the software vendor.

2. The system of claim 1, wherein the computer processor is operable to generate the plurality of database views using a database query statement.

3. The system of claim 2, wherein the computer processor is operable to generate the view for all the selected schemas by using database query statements based on the database view associated with the selected database schema.

4. The system of claim 3, wherein the database query statements are SQL query statements.

5. The system of claim 1, wherein the computer processor is operable to receive input for regenerating entries in the configuration table.

6. The system of claim 1, wherein the computer processor is operable to use the database view from one of the selected database schemas as a template to generate a view of the selected schemas by modifying the view so that the view is capable of accessing additional database tables in the identified schemas.

7. The system of claim 1, wherein a particular database schema is associated with more than one client; and wherein the computer processor is operable to receive an identification from a user of one or more clients to use in the generation of the view of the selected schemas.

8. The system of claim 7, wherein the computer processor is operable to receive an indication from the user that the one or more clients are to be unified and treated as a same client; and to receive an indication from the user that the one or more clients are to be kept separate and treated as separate clients.

9. A process comprising:
receiving into a computer processor a plurality of database tables from a plurality of computer systems, wherein each of the plurality of database tables is associated with a particular computer system, ~wherein each particular computer system is associated with a particular schema, and wherein the plurality of computer systems comprises enterprise resource planning (ERP) systems of a customer of a software vendor;
storing each of the plurality of database tables in a computer storage device according to the particular schema of the computer system with which each database table is associated, wherein the computer storage device comprises an in-memory database of the software vendor;
creating using the computer processor a plurality of database views and storing the plurality of database views in the computer storage device, wherein each of the plurality of views is associated with a particular schema;
generating using the computer processor a configuration table according to the particular schemas of each of the plurality of computer systems;
displaying the configuration table of the particular schemas of each of the plurality of computer systems on a computer display device;
receiving into the computer processor a selection of one or more schemas from the display on the computer display device; and
using a database view from one of the selected database schemas as a template to generate a view for all of the selected schemas; thereby replicating the ERP systems of the customer to different schemas in the in-memory database of the software vendor.

10. The process of claim 9, comprising generating the plurality of database views using a database query statement and generating the view for all the selected schemas by using database query statements based on the database view associated with the selected database schema.

11. The process of claim 9, comprising regenerating entries in the configuration table.

12. The process of claim 9, comprising using the database view from one of the selected database schemas as a template to generate a view of the selected schemas by modifying the view so that the view is capable of accessing additional database tables in the identified schemas.

13. The process of claim 9, wherein a particular database schema is associated with more than one client; and comprising receiving an identification from a user of one or more clients to use in the generation of the view of the selected schemas; receiving an indication from the user that the one or more clients are to be unified and treated as a same client; and receiving an indication from the user that the one or more clients are to be kept separate and treated as separate clients.

14. A computer readable medium comprising instructions that when executed by a client execute a process comprising:
receiving into a computer processor a plurality of database tables from a plurality of computer systems, wherein each of the plurality of database tables is associated with a particular computer system, wherein each particular computer system is associated with a particular schema, and wherein the plurality of computer systems comprises enterprise resource planning (ERP) systems of a customer of a software vendor;
storing each of the plurality of database tables in a computer storage device according to the particular schema of the computer system with which each database table is associated, wherein the computer storage device comprises an in-memory database of the software vendor;
creating using the computer processor a plurality of database views and storing the plurality of database views in the computer storage device, wherein each of the plurality of views is associated with a particular schema;

generating using the computer processor a configuration table according to the particular schemas of each of the plurality of computer systems;

displaying the configuration table of the particular schemas of each of the plurality of computer system on a computer display device;

receiving into the computer processor a selection of one or more schemas from the display on the computer display device; and using a database view from one of the selected database schemas as a template to generate a view for all of the selected schemas; thereby replicating the ERP systems of the customer to different schemas in the in-memory database of the software vendor.

15. The computer readable medium of claim 14, comprising instructions for generating the plurality of database views using a database query statement and generating the view for all the selected schemas by using database query statements based on the database view associated with the selected database schema.

16. The computer readable medium of claim 14, comprising instructions for regenerating entries in the configuration table.

17. The computer readable medium of claim 14, comprising instructions for using the database view from one of the selected database schemas as a template to generate a view of the selected schemas by modifying the view so that the view is capable of accessing additional database tables in the identified schemas.

18. The computer readable medium of claim 14, wherein a particular database schema is associated with more than one client; and comprising instructions for receiving an identification from a user of one or more clients to use in the generation of the view of the selected schemas; instructions for receiving an indication from the user that the one or more clients are to be unified and treated as a same client; and instructions for receiving an indication from the user that the one or more clients are to be kept separate and treated as separate clients.

* * * * *